April 6, 1948. A. J. LAUTMANN 2,438,976
RIVET
Filed Dec. 4, 1943   2 Sheets-Sheet 1
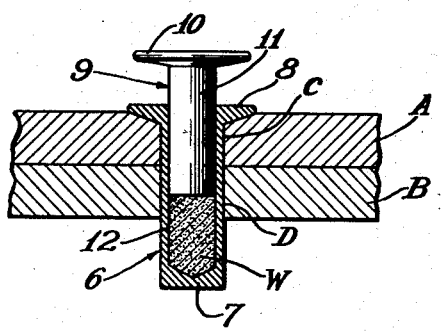
Fig. 1.
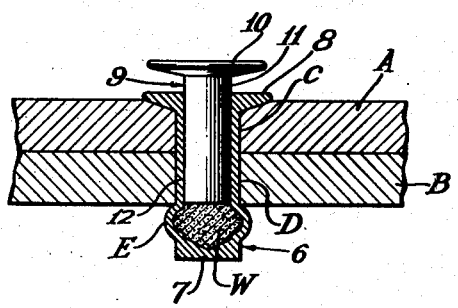
Fig. 2.
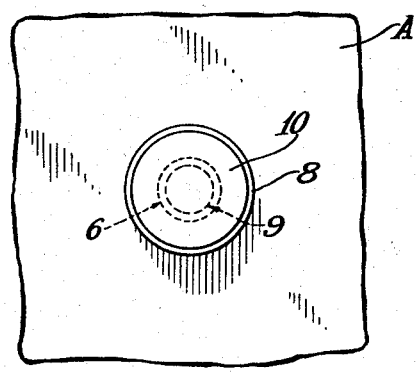
Fig. 3.
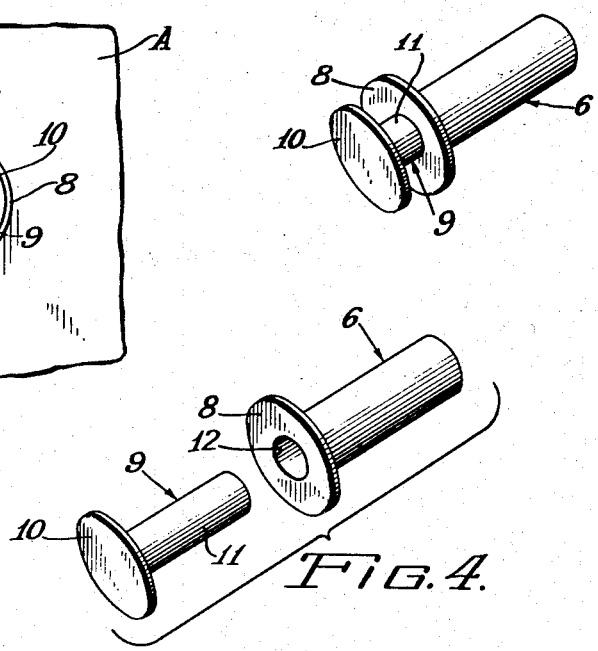
Fig. 5.
Fig. 4.
Inventor:
Alfred J. Lautmann
By Wallace and Cannon
Attorneys April 6, 1948.  A. J. LAUTMANN  2,438,976
RIVET
Filed Dec. 4, 1943  2 Sheets-Sheet 2
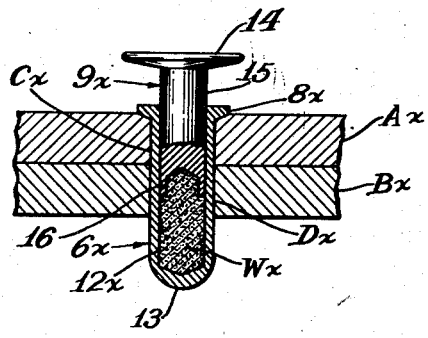
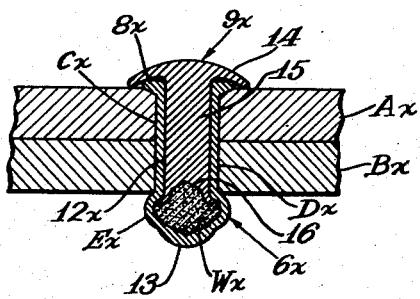
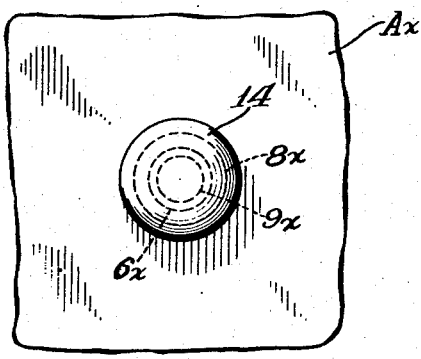
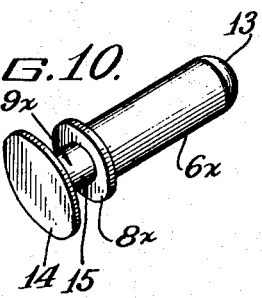
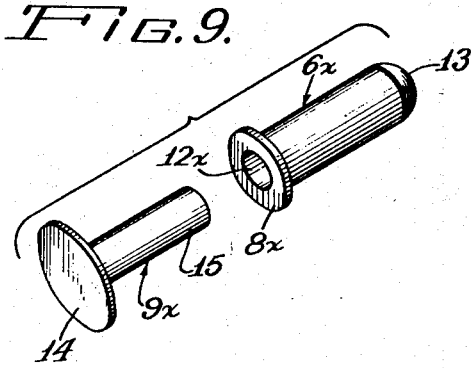
Inventor:
Alfred J. Lautmann
By Wallace and Cannon
  Attorneys Patented Apr. 6, 1948

2,438,976

UNITED STATES PATENT OFFICE 2,438,976

RIVET

Alfred J. Lautmann, Detroit, Mich.

Application December 4, 1943, Serial No. 512,880

8 Claims. (Cl. 85—40)

This invention relates to rivets and particularly to rivets of the character which may be expanded to be secured in position without requiring access to both ends thereof.

There are many instances where rivets are used for securing together two or more parts that are so arranged that access can be had to but one end of the rivet so that it is necessary that expansion of the rivet be effected from but one end thereof and among the primary objects of my invention is to enable such expansion of a rivet to be brought about in a novel and efficient manner.

Moreover, there are many instances in which the parts secured together by one or more rivets are subjected to vibration or to other forces which may tend to bring about loosening of the rivets and in such circumstances it is advantageous to employ a rivet of such nature that the expansion thereof may be increased over and above that originally required to secure two or more parts together and to enable this to be effected in a novel and efficient manner is yet another object of this invention.

Still other objects of this invention are to utilize relatively movable elements in a rivet and to so relate such elements that one of the elements will reenforce the other when the rivet is installed; to confine a material between adjacent portions of the relatively movable elements that is of such nature that upon movement of one of said elements relative to the other, at least one of such elements will be expanded at the portion thereof adjacent to such material; to utilize male and female members in a rivet and to close one end of the female member so that a material as aforesaid may be confined between such closed end and the inner end of the male member that is inserted into the female member from the other and open end thereof; to provide a flange on the female member adjacent to the open end thereof which will cooperate with a portion of the female member that is expanded when the male member is forced toward the closed end of the female member and the confined material, the cooperation between such a flange and expanded portion being effective to secure together two or more parts having openings therein into which the female member of the rivet is inserted; and to so relate the male and female members of the rivet that inadvertent or undesired separation thereof may be prevented whereby, when so desired, these parts may be handled as a unit.

Yet other objects are to afford expansible portions in each element of a two part rivet and to so relate such portions that separation of the parts of the rivet will be prevented after expansion of such expansible portions in course of use of the rivet; to so arrange the male member of a rivet of the aforesaid character as to enable expansion of the inner end thereof, in the course of installation of the rivet, and thereby interlock the parts of the rivet; to so relate the exposed ends of the male and female portions of a rivet of the aforesaid character that the exposed head of the male member may be arranged to conceal and enclose the adjacent portion of the female member when the rivet is installed in operative position; and to so relate the expanded portion of the member and the head thereof that interlocking thereof with, and reenforcement thereby of, the female member will be realized.

Other and further objects of the present invention will be apparent from the following description and claims and will be understood by reference to the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 1 is a view partly in elevation and partly in section illustrating one form of the novel rivet of my invention inserted into position to secure two adjacent parts together and showing the rivet prior to expansion thereof to secure the parts together;

Fig. 2 is a view similar to Fig. 1 but showing the rivet in its expanded condition and securing the two parts together;

Fig. 3 is a top plan view of the parts shown in Fig. 1;

Fig. 4 is a perspective view illustrating the two parts of my novel rivet, as illustrated in Figs. 1, 2 and 3 in disassembled relation;

Fig. 5 is a perspective view showing my novel rivet as assembled for transportation and installation; and Figs. 6 to 10 are respectively views corresponding to Figs. 1 to 5 and which show another form of my novel rivet.

The novel rivet of my invention, as shown in Figs. 1 to 5, inclusive, of the accompanying drawings, is depicted as it is employed to secure together two flat plates A and B which respectively have openings C and D formed therein that are arranged in aligned relation so that the rivet may be inserted thereinto. It will be understood, however, that my novel rivet may be utilized in any manner in which rivets are conventionally employed and particularly in those instances where access can be conveniently had to but one end of the rivet.

My novel rivet as shown in Figs. 1 to 5, inclusive, comprises a female member 6 which has an opening or bore extended therethrough that is closed at one end, as indicated at 7, the bore being open at the opposite end thereof and a flange 8 is provided on the female member adjacent to the open end thereof. This rivet also includes a male or plunger member 9 which in the present form has a flat enlarged head 10 at one end thereof. The plunger portion 11 of the male member 9 is adapted to be inserted into the opening or bore 12 of the female member 6 and desirably the relation between the extent of the bore 12 and the plunger 11 is such that, when the head 10 of the male member 9 is engaged with the open end of the female member and adjacent to the exposed face of the flange 8, the inner end of the plunger 11 will be spaced from the inner face of the closed end 7 of the bore 12. The diameter of the bore 12 and the diameter of the plunger 11 are desirably so related one to the other as to afford a tight frictional engagement between these two elements and preferably the fit between these two elements is such that inadvertent and undesired separation of the elements one from the other will be avoided. Moreover, while the female member 6 and the male member 9, as well as the plunger 11 and bore 12, are desirably circular in cross section, it will be understood that resort may well be had to polygonal shapes without departing from the ambit of my invention.

Prior to the time the plunger 11 is inserted into the bore 12 a quantity of a material W is confined in the bore 12 intermediate the closed end 7 thereof and the inner end of the plunger 11. Desirably the material W is of such nature that when the male member is forced toward this material and the closed end of the female member, as by a blow being struck on the exposed end of the male member, the material W will cause the adjacent wall portion of the female member to be expanded. I have found the ordinary commercially available grade of paraffin wax or beeswax to be suitable for use as the material W and I prefer to use such material inasmuch as it is relatively inexpensive. However, any of the natural or synthetic waxes may be utilized in place of paraffin wax or beeswax without departing from the purview of my invention so long as the material is of such nature that it may be confined in the rivet without deterioration.

Among the ways in which my novel rivet may be utilized is to insert the female member 6 into aligned openings as C and D so as to bring the flange 8 into engagement with one of the exposed faces of one of the members including such openings and which are to be secured together and also so as to dispose the other or free end of the rivet in juxtaposition to the other of the exposed faces of the members to be secured together. At the time the rivet is so inserted, the male member 9 will desirably be related to the female member 6 much in the manner shown in Figs. 1 and 5. Once the rivet is arranged in the manner just described, a sharp blow is struck on the head 10 of the male member 9 so as to force the plunger 11 inwardly toward the confined material W which thereupon becomes effective to expand the adjacent wall section of the female member 6 in the manner, for example, indicated at E in Fig. 2. In this regard the wall of the female member 6 is preferably thinner than the closed end 7 thereof so that this end will effectively resist the force impressed as aforesaid so as to thereby insure that the expansion will take place in the manner intended and as indicated for example, at E in Fig. 2. Moreover, the plunger 11 is fitted in the bore 12 in such a way as to insure that the material W will not flow past the plunger and through the bore when force is applied as aforesaid.

Yet further, by tightly fitting the male member in the female member, retention of this male member in the female member is assured even after expansion of the wall of the female member as aforesaid. Therefore, the male member, which in this form of the invention is solid from end to end, may be effective to reenforce the tubular female member, particularly insofar as shearing stresses may be concerned.

One of the important advantages of my invention is that once two parts or elements as A and B have been secured together by expanding the rivet as indicated at E in Fig. 2, further expansion of the rivet may be brought about by again striking a sharp blow on the head 10 of the male member 9. This will be particularly important in those instances where the parts as A and B are subjected to vibration or to other forces of such nature as to tend to promote separation of the parts. Thus, if the elements or parts A and B should tend to separate subsequent to the time the female member 6 has been expanded as indicated at E, it is only necessary that a sharp blow be struck on the head 10, whereupon the material W will again be effective to produce further expansion of the wall of the female member 6.

It is not essential that the plunger of the male member as 9 be tightly fitted into a bore as 12 in a female member as 6 so as to prevent inadvertent separation of these parts for a quantity of material as W may be inserted into the cylindrical member as 6 at the time the rivet is to be utilized to secure two or more parts or elements together and at this time a suitable male or plunger member may be inserted into the bore so that a blow may be struck thereon to bring about expansion of the wall of the female member as 6 in the manner explained hereinabove. However, I prefer to assemble the male member as 9 and the female member as 6, with the quantity of material as W confined in the female member, as a unit for so to do insures that all the necessary elements of that rivet will be available at all times and this facilitates merchandising my rivets as a unit. Furthermore, it is this that insures that further expansion of the rivet may be effected in the manner explained hereinabove at any time and whenever the need so to do arises.

The form of my invention shown in Figs. 6 to 10, inclusive, is somewhat like that shown in Figs. 1 to 5, inclusive, and insofar as the elements of the rivet shown in Figs. 1 to 6 correspond to those shown in Figs. 1 to 5, such elements are designated by the same reference character as that applied to the particular element in Figs. 1 to 5 but, where such reference characters are employed in Figs. 6 to 10, the letter "$x$" is added thereto.

Thus, the rivet as shown in Figs. 6 to 10 includes a female member $6x$ which has a bore $12x$ therein that is closed at one end thereof. The closed end 13 of the female member $6x$ is desirably rounded for so to do, in many instances, facilitates insertion of the rivet into operative position. However, as in the case of the closed end 7 of the female member 6, the closed end 13 of the female member $6x$ is desirably somewhat thicker than the wall portion of the member $6x$ about the bore $12x$. Moreover, for a purpose to be explained presently, the flange $8x$ at the open end of the female member $6x$ is desirably sized to be smaller than the head 14 of the male member $9x$.

The plunger 15 of the male member $9x$ is desirably solid throughout the extent thereof except that a recess 16 is formed in the inner end thereof, that is, at the end thereof opposite the head 14, for a purpose presently explained. Yet further, the length of the plunger 15 relative to the extent of the bore $12x$ is such that the aforesaid inner end of the plunger, when the two parts of the rivet are arranged in installed relation, will be aligned with a part of the portion of the female member that is to be exposed as at $Ex$. The head 14 is desirably sized to have the free edge thereof disposed outwardly of the free edge of the flange $8x$.

Other than in the respects just explained, the form of my rivet shown in Figs. 6 to 10, inclusive, corresponds to that shown in Figs. 1 to 5, inclusive. However, the form of my invention shown in Figs. 6 to 10 is of such nature that separation of the elements of the rivet, after installation thereof, is effectively prevented. Moreover, the head 14 may be arranged to conceal and protect the flange as $8x$.

Thus, the recess 16 is extended into that part of the plunger 15 that is arranged to extend into alignment with the expansible portion of the female member $6x$ and the provision of the recess 16 affords a relatively thin wall portion at the inner end of the plunger that is of such nature that, when a blow is struck on the head 14 so as to force the plunger 15 toward the closed end 13, the material $Wx$ not only expands the adjacent wall of the female member $6x$ but also the thin wall of the plunger. This expanded portion of the plunger flares out and interlocks with the expanded portion, as at $Ex$, of the female member and thereby the two parts of the rivet are secured against separation.

Moreover, the marginal portion of the head as 14 of a male member as $9x$ may be peened over so as to protect and conceal the flange as $8x$ of a female member as $6x$ and in so doing a further interlocking of the two elements of the rivet is realized. Furthermore, the above described arrangement of the male member, in the course of installation thereof, and the relation thereof to the female member, is such that the male member effectively reenforces the female member and this also contributes to the functioning of the rivet in the use thereof, that is, such arrangement assists the female member in securing together two parts as $Ax$ and $Bx$.

While further expanson of the female member shown in Figs. 6 to 10, subsequent to initial installation thereof, cannot be effected to the same extent as this may be effected in the form of my rivet as shown in Figs. 1 to 5, I have found that sufficient further expansion may be realized in most instances where necessary with the form of my rivet shown in Figs. 6 to 10.

While the elements or parts of my novel rivet may be made of wide variety of materials, those elements which are to be expanded in the manner above explained are desirably made of a relatively soft material such as a soft steel, brass, aluminum or the like or suitable alloys. Moreover, where corrosion resistance, such as resistance to rusting, is desirable resort may well be had to a material embodying such properties as aluminum, magnesium, brass or alloys or the like.

Yet further, the male and female parts or elements of my novel rivet may be produced in a wide variety of ways as may be desired or convenient as by being turned from bar stock or by stamping or like operations.

This application in part is a continuation of my application Serial No. 498,756, filed August 16, 1943, which has been formally abandoned.

It will be manifest from the foregoing description that a rivet embodying my invention will enable the hereinabove set forth and related objects to be realized and, therefore, while I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. A rivet comprising a female member having an opening therein that is closed at one end thereof and which member has a flange thereon adjacent to the other end thereof, a male member inserted into said opening, each of said members including expansible portions arranged in juxtaposed relation, and a quantity of material confined in said opening adjacent to said expansible portions and which is effective to expand said expansible portions when the male member is forced toward such material and the closed end of said opening.

2. A rivet comprising a relatively elongated female member having an opening formed therein to afford a relatively thin wall section in said member about said opening, said member including an end section closing one end of said opening and having an outwardly projecting flange at the other end thereof, a male member inserted into said opening and having a recess at the inner end thereof, and a quantity of material confined in said opening between said end section and the inner end of said male member and which is effective to expand said relatively thin wall section and the sections of said male member about said recess when said male member is forced toward such material and said end section, such expansion of said sections being effective to interlock said members against separation.

3. A rivet comprising a relatively elongated female member having a bore extended thereinto from one end thereof that terminates in spaced relation with the other end of said member, a male member inserted into said bore, the extent of said male member into said bore being such that the inner end thereof is spaced from the inner end of said bore when the opposite end thereof is at least substantially aligned with the end of the female member from which said bore is extended whereby said members include coextensive portions, said male member having a recess in the inner end thereof whereby a thin wall section is afforded thereon, said female member having a thin wall section about said bore, and a quantity of wax-like material in said bore between the inner end of the bore and the inner end of the male member and which is effective to expand said thin wall sections.

4. A rivet as claimed in claim 3 wherein the female and male members have flanges thereon at the adjacent free ends thereof, the flange on the male member having the outer edge thereof disposed outwardly of the free edge of the other flange.

5. A rivet comprising a female member having an opening therein that is closed at one end thereof, a male member insertable as a tight fitting slidable piston into said opening, each of said members including expansible portions adapted to be arranged in juxtaposition to each other upon insertion of the male member into said opening, and a quantity of a deformable force transmitting solid material confined in said opening adjacent to said expansible portions and effective to expand said expansible portions when the male member is inserted into said opening and forced toward such material.

6. A rivet comprising a female member having an opening therein that is closed at one end thereof and which has a flange thereon adjacent to the other end thereof, a male member inserted into said opening and having a flange at the outer end thereof, each of the said members including expansible portions arranged in juxtaposed relation, and a quantity of a material confined in said opening adjacent to said expansible portions and which is effective to expand such portions when the male member is forced toward said material and the closed end of the said opening, the flange on the male member having the free edge thereof disposed outwardly of the free edge of the flange on said female member.

7. A rivet assembly comprising a relatively elongated female member having a smooth cylindrical bore of uniform cross sectional form extending thereinto from the outer end and terminating in spaced relation with respect to the inner end thereby forming elongated wall sections, the diameter of the bore being such that the elongated wall sections are relatively thin as compared with the closed inner end of the member, a male member of smooth cylindrical external form complemental to the cylindrical bore and of a length less than the bore of the female member, said male member being inserted into said female member as a slidable piston in tight frictional engagement therewith so as to prevent inadvertent separation of the members, and a quantity of solid, non-deteriorating, deformable material confined in the bore between the closed inner end thereof and the inner end of the male member, the quanttiy of material being of an amount that when the male member is driven toward the closed end of the female member the material is compressed and expands to exert force on the thin wall sections of the female member to bulge the same and thereby clinch the rivet into position without destroying the clinching and securing effect thereof while substantially all of the material remains confined between the inner end of the male member and the expanded and clinched end of the female member to impart additional strength thereto and form a substantially solid unitary rivet with the walls of the female member in close association with the body of the male member and the compressed solid in intimate association with the expanded end of the female member.

8. A rivet assembly comprising a relatively elongated female member provided with an outwardly projecting flange at its outer end and having a smooth cylindrical bore of uniform cross sectional form extending thereinto from the outer end and terminating in spaced relation with respect to the inner end, thereby forming elongated wall sections, the diameter of the bore being such that the elongated wall sections are relatively thin as compared with the closed inner end of the member, a male member provided with an outwardly projecting flange of a diameter less than the diameter of the flange on the female member and of smooth cylindrical external form complemental to and of a length less than the cylindrical bore of the female member, said male member being inserted into said female member as a slidable piston in tight frictional engagement therewith so as to prevent inadvertent separation of the members, and a quantity of solid, non-deteriorating, deformable material confined in the bore between the closed inner end thereof and the inner end of the male member, the quantity of material being of an amount that when the male member is driven toward the closed end of the female member the material is compressed and expands to exert force on the thin wall sections of the female member to bulge the same and thereby clinch the rivet into position without destroying the clinching and securing effect thereof while substantially all of the material remains confined between the inner end of the male member and the expanded and clinched end of the female member to impart additional strength thereto and form a substantially solid unitary rivet with the walls of the female member in close association with the body of the male member and the compressed solid in intimate association with the expanded end of the female member.

ALFRED J. LAUTMANN.

REFERENCES CITED

The following references are of record in the file of this patent:

UNITED STATES PATENTS

| Number | Name | Date |
|---|---|---|
| 1,400,401 | Allan | Dec. 13, 1921 |
| 1,879,663 | Dreyer | Sept. 27, 1932 |
| 2,213,818 | Krause | Sept. 3, 1940 |
| 2,342,866 | Jakosky | Feb. 29, 1944 |
| 2,344,717 | Mills et al. | Mar. 21, 1944 |

FOREIGN PATENTS

| Number | Country | Date |
|---|---|---|
| 340,664 | Italy | May 25, 1936 |
| 544,257 | Great Britain | Apr. 3, 1942 |